United States Patent [19]
Beylat et al.

[11] Patent Number: 5,920,416
[45] Date of Patent: Jul. 6, 1999

[54] OPTICAL METHOD OF TRANSMITTING DIGITAL DATA

[76] Inventors: Jean-Luc Beylat, Antony; José Chesnoy, Paris; Denis Penninckx, Montlhery, all of France

[21] Appl. No.: 08/803,129

[22] Filed: Feb. 21, 1997

[30] Foreign Application Priority Data

Feb. 23, 1996 [FR] France ................................ 96 02275

[51] Int. Cl.$^6$ .................................................. H04B 10/04
[52] U.S. Cl. .......................................... 359/181; 359/186
[58] Field of Search .................................... 359/181–186; 375/239, 289

[56] References Cited

U.S. PATENT DOCUMENTS 5,373,382  12/1994  Pirio et al. .............................. 359/181

FOREIGN PATENT DOCUMENTS

WO95/29539  11/1995  WIPO.

OTHER PUBLICATIONS

K. Yonenaga et al, "Optical Duobinary Transmission System with No Receiver Sensitivity Degradation", *Electronics Letters*, vol. 31, No. 4, Feb. 16, 1995, pp. 302–304.

*Primary Examiner*—Leslie Pascal

[57] ABSTRACT

To increase the transmission length in an optical fiber, a method of transmitting digital data uses both power modulation and phase modulation of an optical carrier. To compensate the chromatic dispersion produced by the fiber, a phase-shift is applied to the wave within each time cell in which the optical power is low and that precedes or follows a cell in which the power is high. Applications include long-distance optical transmission using standard fibers.

10 Claims, 3 Drawing Sheets

OPTICAL METHOD OF TRANSMITTING DIGITAL DATA

BACKGROUND OF THE INVENTION

1. Field of the invention

The invention is in the field of transmission of digital data by optical means. It is more particularly concerned with transmission at high bit rates over long-haul fiber optic links.

2. Description of the prior art

In this case transmission is effected by means of an optical transmitter connected to an optical receiver by the fiber. The transmitter modulates the power of an optical carrier wave in accordance with the information to be transmitted. The modulation usually consists in varying the power of the carrier wave between two levels: a low level corresponding to extinction of the wave and a high level corresponding to the maximum optical power of a laser oscillator. By convention, the low and high levels respectively represent the binary values "0" and "1". The level variations of the wave are triggered at times imposed by a clock signal which in this way defines successive time cells allocated to the data to be transmitted.

The maximal transmission distance is generally limited by the ability of the receivers to detect these two power levels without errors after propagation of the modulated wave in the optical link. To increase this distance, an attempt is generally made to increase the ratio between the optical power of the high level and that of the low level, this ratio defining the "extinction rate" which is one of the characteristics of the modulation.

Moreover, for a given distance and a given extinction rate, the information bit rate is limited by the chromatic dispersion caused by the fibers. This dispersion is caused by the dependence of the effective index of the fiber on the wavelength of the wave transported and one consequence of this is that the width of the transmitted pulses increases as they propagate along the fiber.

One proposal to limit the consequences of this phenomenon is to reduce the bandwidth of the signal to be transmitted by means of appropriate coding. One particular proposal is to use the "duobinary" code that is well known in the field of electrical transmission. This code has the property of halving the signal bandwidth. The code uses a signal with three levels respectively symbolized 0, + and −. The binary value 0 is coded by the 0 level and the value 1 is coded either by the + level or by the − level, with an encoding rule whereby the levels coding two successive blocks of "1" surrounding a respectively even or odd number of consecutive "0" are respectively identical or different.

The use of the duobinary code for optical transmission is mentioned in the article: "10 Gbit/s unrepeatered three-level optical transmission over 100 km of standard fibre", X. Gu et al, ELECTRONICS LETTERS, 9 December 1993, Vol. 29, N° 25. In this article, the three levels 0, +, − respectively correspond to three optical power levels.

U.S. patent application SN 08/557,184 also describes duobinary coding applied to optics. In this document, the binary value "0" always corresponds to a low level of the optical power and the symbols + and − correspond to the same high optical power level and are distinguished by a 180° phase-shift of the optical carrier.

The use of this latter phase inverting duobinary code is also mentioned in the article: "Optical duobinary transmission system with no receiver sensitivity degradation", K. Yonenaga et al, ELECTRONICS LETTERS, 16 February 1995, Vol. 31, N°4.

Although these reports of experiments with this code indicate an improvement compared to the conventional NRZ ("no return to zero") code, this improvement is not always obtained. On approaching ideal conditions for use of this code, in particular the highest possible extinction rate, the maximal improvement should be obtained. Paradoxically, simulations and tests have given results which are the opposite of those expected.

If the physical effects of the duobinary code in the context of fiber optics are analyzed in detail, it can be shown that a reduction in the bandwidth of the signal is indeed obtained. On the other hand, this code has no influence on the spectrum of each pulse considered in isolation, whereas it is precisely this spectrum which is decisive in the matter of the effects of chromatic dispersion.

The positive results reported by various articles are difficult to explain. Although some experimental parameters can be verified (length and quality of the fiber, bit rate), other parameters cannot be accurately controlled: characteristics of the optical components and the real operation of the control electronic circuits.

Simulations and tests in which the experimental parameters were varied, indicated that an improvement is obtained provided that a phase-shift of the carrier wave is produced within each "0" which precedes or succeeds each block of "1" or each isolated "1". Moreover, it is not necessary for the low power level that codes the "0" to be the lowest possible, in other words for the extinction rate to be the highest possible. In practise an optimal value of the extinction rate is a complex function of the other experimental parameters.

In view of the above, an aim of the invention is to propose an optical transmission method exploiting the observations reported above. This method could be called the "phase-shaped binary transmission" (PSBT) method.

SUMMARY OF THE INVENTION

To be more precise, the invention consists in a method of transmitting binary data contained in respective successive time cells, said data being in the form of an optical signal obtained by power modulation of an optical carrier wave, a first and a second binary data value respectively corresponding to a low and a high mean power within each cell containing said data, wherein a phase-shift is applied to said carrier wave within each cell that contains said first binary value and precedes or succeeds any block of consecutive cells containing said second binary value or any isolated cell containing said second binary value.

To simplify control, it is feasible to effect this phase-shift automatically in each cell containing the first binary value. However, to obtain the required technical effect, it is sufficient for the phase-shift to occur in each cell containing a "0" (low level) and near a block of "1" or an isolated "1".

Moreover, experience shows that it is advantageous for the absolute value of the phase-shift for an isolated cell containing a "0" to be greater than the absolute value of the phase-shift for a non-isolated cell.

In accordance with one more particular aspect, the absolute value of the phase-shift for an isolated cell is preferably between 90° and 180°. In the case of a non-isolated cell the absolute value of the phase-shift is preferably between 45° and 180°.

A first possibility is for the phase-shifts to be instantaneous. A "Mach-Zehnder" type interferometer having this property may be used for this. Another possibility is for the phase-shift to be progressive. In this variant, the additional problem arises in practise of a phenomenon known as "chirp" in which a progressive phase variation is accompanied by an unwanted phase variation.

To make provision for this phenomenon, and in accordance with one variant of the invention, said phase-shift is not instantaneous for each non-isolated cell containing the first binary value and that respectively precedes or succeeds an isolated cell containing the second binary value or a block of consecutive cells each containing the second binary value and said phase-shift corresponds mathematically and/or physically to a negative or positive frequency pulse, respectively.

Moreover, when a phase modulator is used, it is necessary to limit the cumulative phase-shift. To this end, the phase-shifts effected in the successive isolated cells containing the first binary value advantageously alternately correspond mathematically to positive and negative frequency pulses of the carrier wave.

In accordance with another characteristic contributing to an improved result, the phase-shifts are effected substantially at the center of the cells.

Other aspects of the invention and of its implementation will emerge from the remainder of the description, which is given with reference to the figures.

DETAILED DESCRIPTION OF THE PREFERRED EMBODIMENTS

Figure 1:
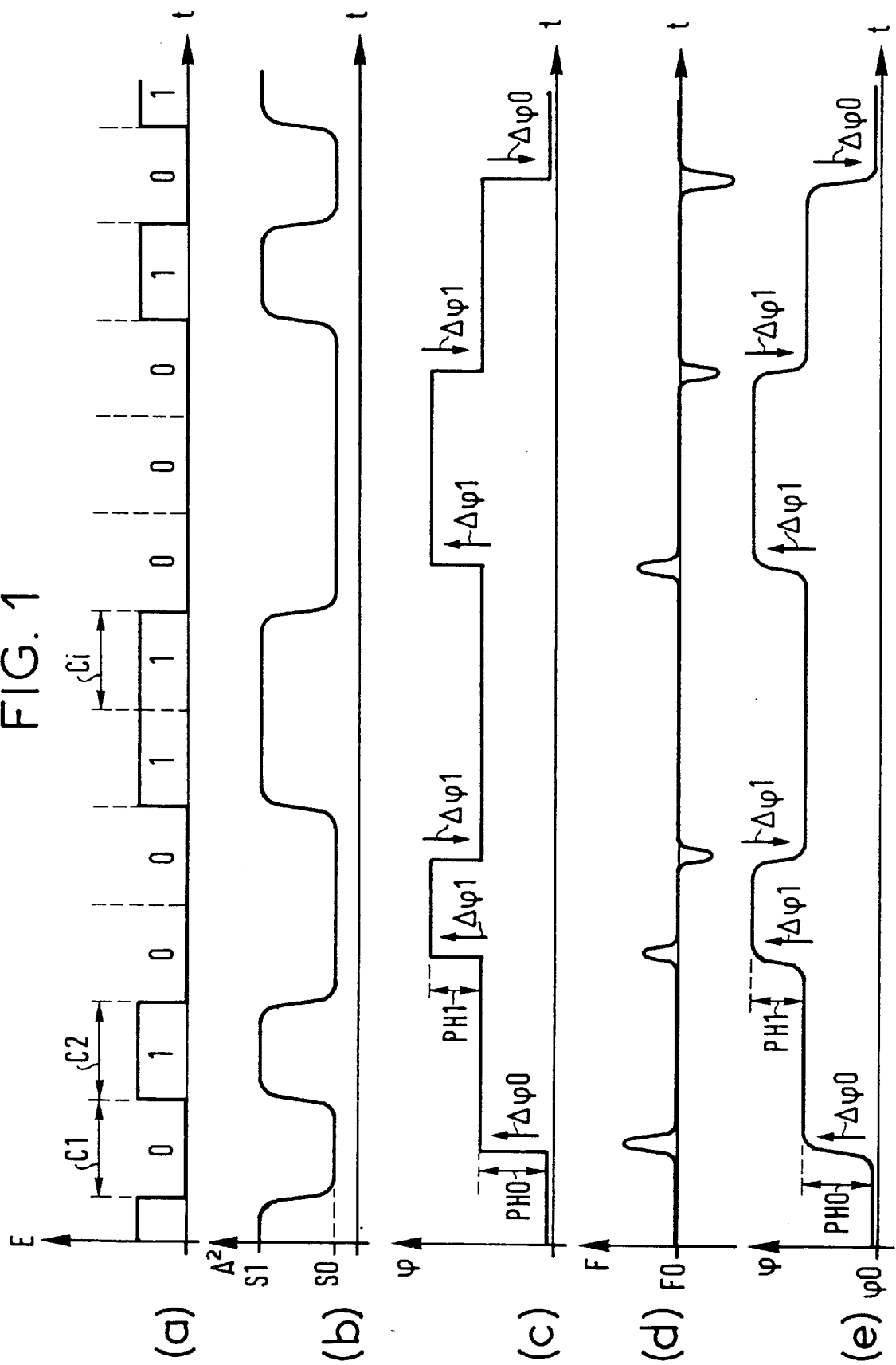
FIG. 1 shows timing diagrams illustrating the method of the invention.

The timing diagram in FIG. 1 shows a stream of binary data to be transmitted. The data is in the form of electrical pulses E synchronized by a clock signal, for example. Each time interval between two successive clock signals is called a "bit-time" and defines a time window C1, C2, Ci delimiting the logic value "0" or "1" according to whether the level of the signal E is low or high.

In accordance with the invention, the binary data is transmitted in the form of an optical signal the power and phase of which are modulated. The timing diagrams b and c respectively show the variations of the power $A^2$ and of the phase $\phi$ of the transmitted optical wave. As shown in timing diagram b, the power $A^2$ is modulated in response to the modulated signal E so as to have in each cell a low mean power S0 or a high mean power S1 according to whether the value of the binary data is 0 or 1. The power S0 of the low level is sufficient to allow interference between the neighboring 0 and 1 symbols during the propagation of the modulated wave in the transmission fiber.

Timing diagram c shows the variations of the phase $\phi$ of the transmitted wave relative to an arbitrary reference. The direction of phase variation shown corresponds to the convention whereby the carrier wave is represented as a function of time t by the complex expression: $A_p \exp(jw_o t)$ and the transmitted wave S of amplitude A by: $S = A \exp[j(wt + \phi)]$, where $w_o$ and $w$ are the angular frequencies of the carrier wave and of the transmitted wave and $\phi$ is the phase of the wave transmitted at an arbitrary initial time. With this convention, a respectively positive or negative phase-shift corresponds mathematically to a respectively positive or negative frequency pulse. Moreover, mathematically, the shift will be either progressive or instantaneous according to whether the corresponding frequency pulse is finite or infinite.

Accordingly, the phase $\phi$ is subject to a variation $\delta\phi 0$ of absolute value PH0 within each cell containing an isolated 0 and a phase variation $\delta\phi 1$ of absolute value PH1 is imposed within each cell containing a non-isolated 0 and which precedes or succeeds a 1 cell.

In a simplified version of the method of the invention a phase variation with an absolute value of around 180° may be applied systematically within each cell containing a 0. However, studies have shown that these phase variations should preferably follow the following rules:

PH0 is greater than PH1;

the absolute values of PH0 and PH1 of the phase-shift are respectively between 90° and 180° and between 45° and 180°;

the shift $\delta\phi 1$ in a non-isolated 0 cell and which precedes a rising edge is negative;

the phase-shift $\delta\phi 1$ in a 0 cell which succeeds a falling edge is positive.

Moreover, if a phase modulator is used, the cumulative phase-shift will be limited if the phase-shifts $\delta\phi 0$ in the isolated 0 cells are alternately positive and negative.

In the foregoing, it is assumed that the phase-shifts are instantaneous. This mode of operation, with a phase-shift of approximately 180°, may be obtained in practise using a Mach-Zehnder type interferometer, for example. With a device of this kind the phase changes occur at times at which the supply voltage passes through a particular value that also corresponds to a minimum value of the power of the transmitted wave. The phase-shifts may instead be progressive, for example using a phase modulator as in the embodiment to be described below.

The latter instance is illustrated by timing diagrams d and e of FIG. 1. As shown in timing diagram d, the instantaneous frequency f of the transmitted wave is subject to positive or negative finite impulse variations relative to the frequency f0 of the carrier wave. These frequency variations result in progressive shifting of the phase $\phi$ as shown in timing diagram e. It can be shown that the variations $\delta\phi 1$ of the phase in non-isolated 0 cells correspond to positive or negative frequency pulses according to whether the cell follows a falling edge or precedes a rising edge of the amplitude A of the transmitted wave.

Figure 2:
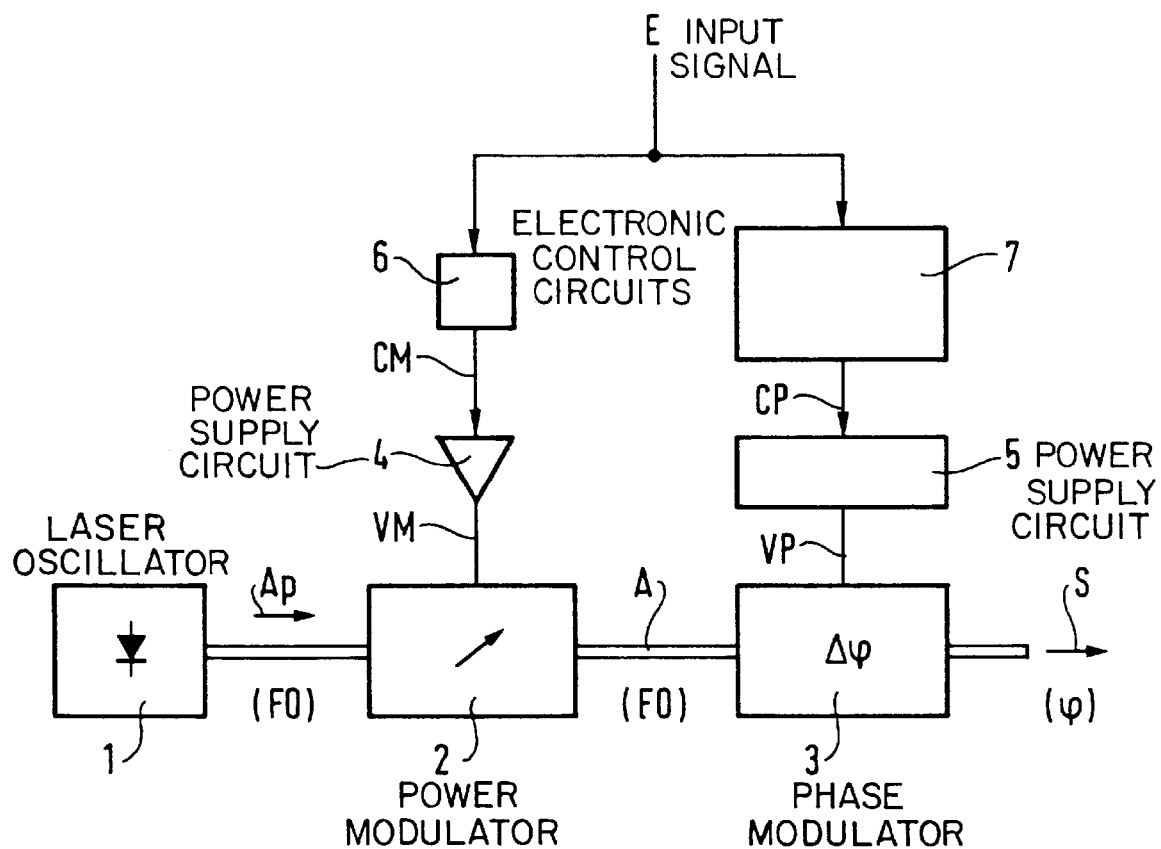
FIG. 2 shows a first embodiment of the method of the invention.

FIG. 2 is a diagrammatic representation of a first embodiment of the method of the invention. The optical part essentially comprises a laser oscillator 1 coupled to a power modulator 2 in turn coupled to a phase modulator 3. The oscillator 1 supplies to the power modulator 2 the carrier wave of amplitude Ap and of frequency f0. The power modulator 2 supplies to the phase modulator 3 a wave of variable amplitude A carried by the same frequency f0. The phase modulator 3 supplies the transmitted wave S of amplitude A and phase $\phi$. The modulator 2 receives a control voltage VM supplied by an electric power supply circuit 4. Similarly, the phase modulator 3 receives a modulation control voltage VP from an electric power supply circuit 5. The power supply circuits 4 and 5 are variable voltage power supplies controlled by respective control signals CM and CP supplied by respective electronic control circuits 6 and 7. The circuits 6 and 7 receive as input the electrical signal E which is in the form of an NRZ modulation corresponding to the sequence of binary data to be transmitted, for example. In this case the circuit 6 may be a simple formatting circuit for adapting the levels of the receive signal E to the power supply circuit 4. It includes any necessary time-delay means of an appropriate kind to synchronize the control signals applied to the modulators 2 and 3. The circuits 6 and 7 advantageously also comprise low-pass filter means for limiting the bandwidth of the modulation. The phase control circuit 7 is shown in more detail in FIG. 3.

Figure 3:
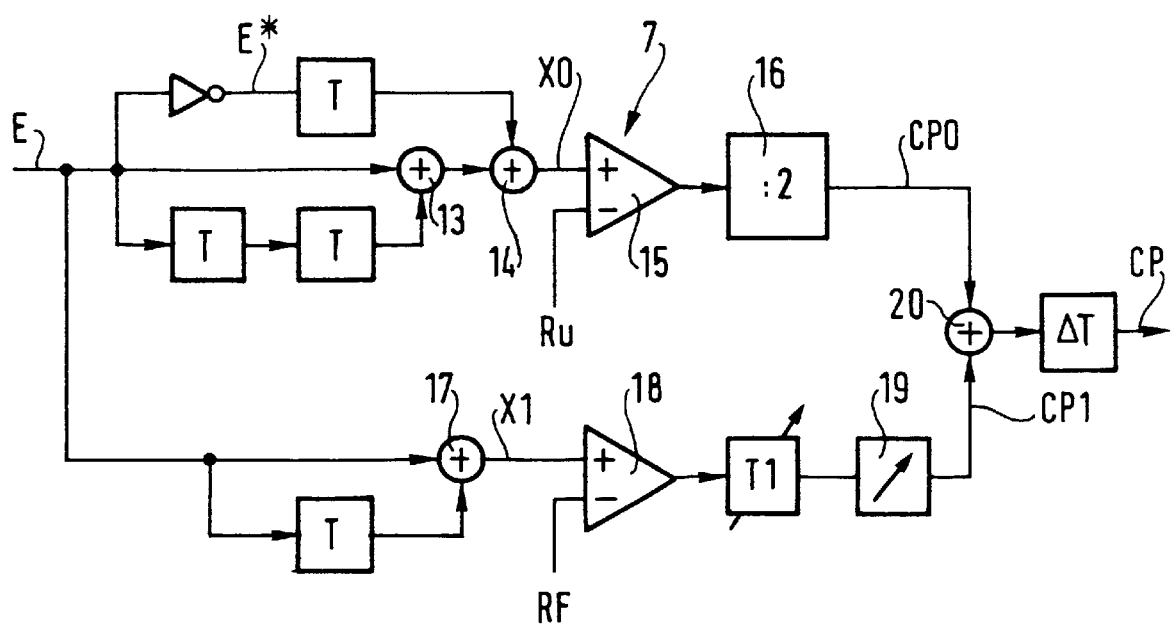
FIG. 3 is an electronic block diagram used in the FIG. 2 embodiment.

The circuit 7 shown in FIG. 3 includes a phase control system CP0 for isolated "0" (top part of diagram) and a phase control system CP1 for non-isolated "0" neighboring a "1" (bottom part of the diagram). The top system includes a first analog adder 13 receiving at its input the signal E and the same signal E delayed by two bit-times T. A second analog adder 14 receives at its input the signal supplied by the adder 13 and the complement E* of the input signal E delayed by one bit-time T. The output X0 of the adder 14 is compared to a reference voltage Ru by a differential amplifier 15 operating as a comparator. The voltage Ru has a value between three times and twice the high level of the signal E. The output of the amplifier 15 is connected to the input of a frequency divider by two 16 the output of which is connected to one input of an output analog adder 20.

The control system for non-isolated "0" includes an analog adder 17 receiving the input signal E and the same input signal E delayed by one bit-time T. The signal X1 supplied by the adder 17 is compared to a second reference voltage Rf in a second differential amplifier 18 operating as a comparator. The voltage Rf is between the low and high levels of the signal E. The output of the amplifier 18 is connected by a variable time-delay device T1 to a variable attenuator 19 the output signal CP1 of which is applied to the second input of the adder 20. The output of the adder is connected to another variable time-delay δT which supplies at its output the phase control signal CP.

With reference to the operation of the FIG. 3 circuit, it can easily be shown that the comparator 15 supplies a pulse of one bit-time T in the presence of an isolated "0". As a result, the signal CP0 at the output of the device 16 changes state each time an isolated "0" is detected. Also, the output of the comparator 18 changes state each time that a non-isolated "0" precedes or succeeds a "1". The variable time-delays T1 and δT are used to resynchronize the signals CP1 and CP0 to the amplitude control signal CM. The attenuator 19 adjusts the respective amplitudes PH0 and PH1 of the phase-shifts δφ0 and δφ1. In this way the variations of the phase control signal CP as a function of time are similar to those of the phase φ, as shown by timing diagram e in FIG. 1.

Figure 4:
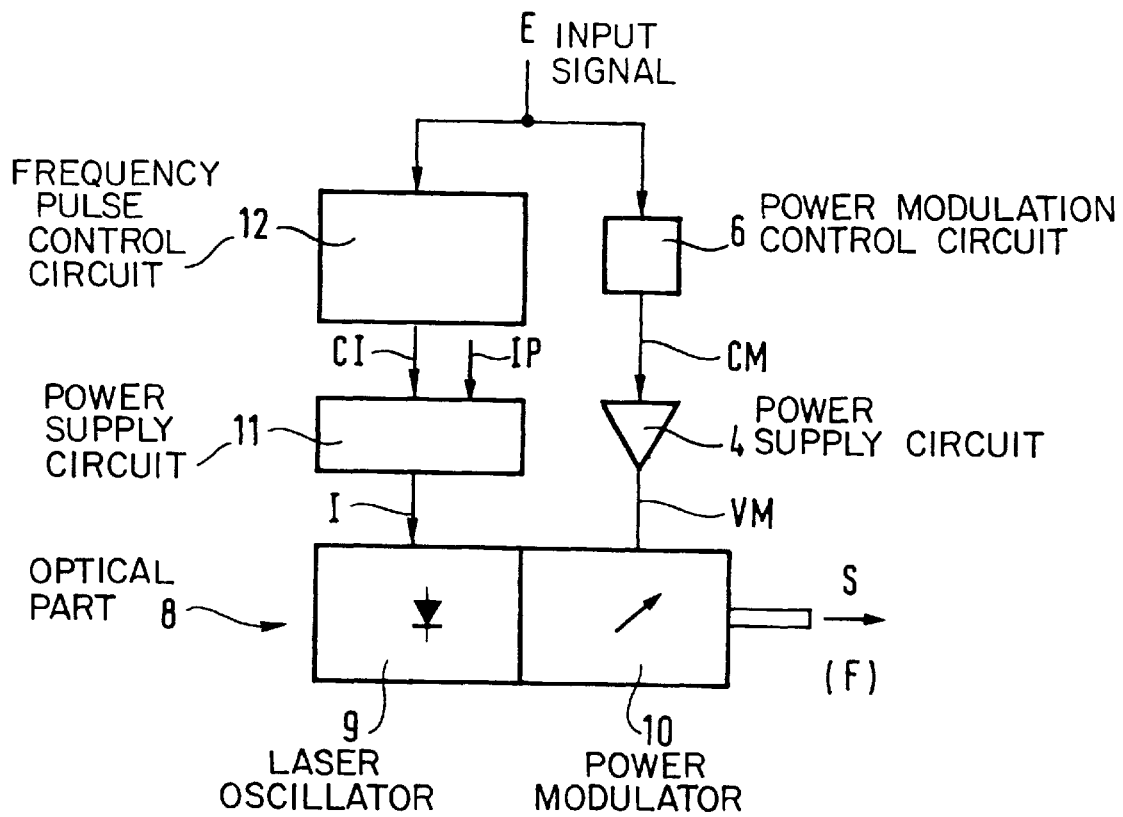
FIG. 4 shows a second embodiment of the method of the invention.

In the second embodiment shown in FIG. 4, the optical part 8 includes only a laser oscillator 9 optically coupled to a power modulator 10. The system may comprise a laser with integral modulator of a type known in itself. The laser part 9 receives an injection current I supplied by a power supply circuit 11. The modulator 10 receives the voltage VM from the power supply circuit 4. The circuits 11 and 4 are respectively controlled by the signals CI and CM respectively supplied by a frequency pulse control circuit 12 and the power modulation control circuit 6. The control circuits 12 and 6 receive as input the electrical signal E.

Differing in this from the previous embodiment, the phase modulation is obtained here by operating on the injection current I of the laser 9. This embodiment exploits the property of lasers of oscillating at a frequency that varies according to the injection current. In an optimized embodiment the laser is designed so that a small variation in current causes a sufficient variation in frequency without the power of the transmitted wave fluctuating appreciably. Similarly, a modulator designed to introduce minimum chirp is advantageously selected.

The power supply circuit 11 essentially comprises a source of current that can be modulated about a polarization current Ip. As in the previous embodiment, the power supply circuit 4 is a source of voltage varying in accordance with the signal CM supplied by the control circuit 6. The circuit 6 is a formatting circuit that can incorporate the variable time-delay and low-pass filter function.

Figure 5:
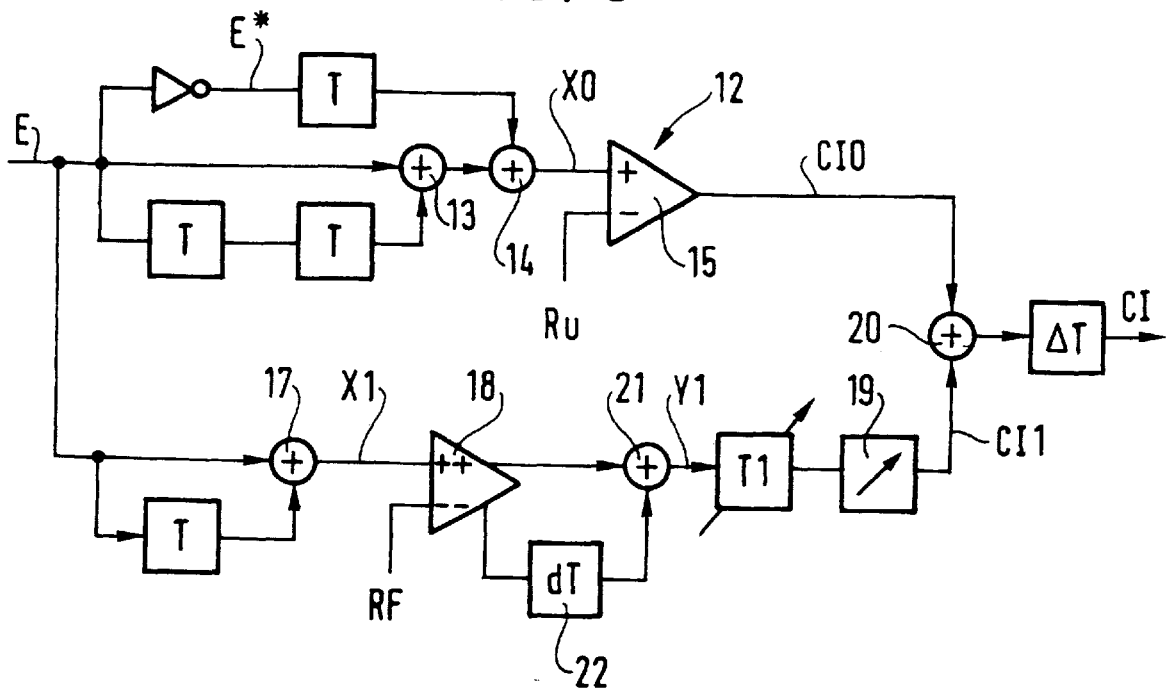
FIG. 5 is an electronic block diagram used in the FIG. 4 embodiment.

The frequency pulse control circuit 12 is shown in more detail in FIG. 5. It includes a frequency pulse control system for isolated "0" (upper part) and a frequency pulse control system for non-isolated "0" neighboring "1" (lower part). The upper part is identical to that of the previous embodiment except that the frequency divider 16 is absent. The lower part includes the analog adder 17 receiving the input signal E and the same signal E delayed by one bit-time T, together with the comparator 18 receiving the output signal X1 of the adder 17 and the reference Rf. The direct output of the comparator 18 is connected to a first input of a fourth analog adder 21. The inverting output of the comparator 18 is connected to the second input of the adder 21 via a time-delay device 22. The signal Y1 supplied by the adder 21 is connected to the attenuator 19 via the variable time-delay device T1. The attenuator 19 supplies the signal CI1 that is received by one of the inputs of the output 20, the second input of which receives the signal CI0 supplied by the comparator 15. The output signal of the adder 20 is applied to a variable time-delay device δT the output of which supplies the frequency pulse control signal CI.

In operation, the signal CI0 supplied by the comparator 15 is in the form of a pulse having a duration equal to the bit-time T each time an isolated 0 is detected. The direct output of the comparator 18 changes state each time that a non-isolated 0 precedes or succeeds a falling or rising edge of the signal E. The time-delay dT imposed by the device 22 being less than one bit-time T, the signal Y1 supplied by the adder 21 is made up of alternately positive and negative pulses each time that a non-isolated "0" follows or precedes a respectively falling or rising edge of the signal E. As in the previous embodiment, the time-delays T1 and δT synchronize the signals CI0 and CI1 to the signal CM.

The attenuator 19 calibrates the pulses of the signal CI1 relative to the signal CI0. Accordingly, the signal CI supplied by the circuit 12 is in the form of positive and negative pulses similar to the frequency pulses f shown in timing diagram d of FIG. 1, except that the frequency pulses in the isolated "0" are always of the same size. In this embodiment there is no point in providing for alternating signs.

By way of comparison, it may be mentioned that with a bitrate of 10 Gbit/s the conventional NRZ modulation method limits the transmission distance to less than 150 km, whereas with the method of the invention distances of up to 300 km can be achieved.

A result like this would be obtained under the following conditions, for example:

Bit-time T: 100 ps.

Extinction rate S1/S0: 10.

PH0: 180°.

PH1: 120°.

Phase-shift rise/fall time: 50 ps–100 ps.

Optical power rise/fall time: 25 ps–50 ps.

Maximum offset of phase-shift time δφ relative to center of 0 cells: 10 ps.

Improvements over NRZ modulation could naturally also be obtained for other values of the extinction rate and phase-shift.

Thus by varying the extinction rate between 5 and 100, it has been shown that an even greater improvement could be obtained if the rate is less than about 20. Moreover, for an extinction rate between 5 and 20, PH0 is preferably greater than PH1, the ranges of effective values for PH0 and PH1 being respectively 90° to 180° and 45° to 180°.

There is claimed:

1. A method of transmitting binary data contained in respective successive time cells, said data being in the form of an optical signal obtained by power modulation of an optical carrier wave, a first and a second binary data value respectively corresponding to a low and a high mean power within each cell containing said data, wherein a phase-shift is applied to said carrier wave within each cell that contains said first binary value and precedes or succeeds any block of consecutive cells containing said second binary value or any isolated cell containing said second binary value.

2. The method claimed in claim 1 wherein said phase-shift is not applied systematically in each cell containing said first binary value.

3. The method claimed in claim 1 wherein said phase-shift in an isolated cell containing said first binary value has an absolute value greater than the absolute value of said phase-shift in a non-isolated cell.

4. The method claimed in claim 1 wherein said phase-shift in an isolated cell containing said first binary value has an absolute value between 90° and 180°.

5. The method claimed in claim 1 wherein said phase-shift in an non-isolated cell containing said first binary value has an absolute value between 45° and 180°.

6. The method claimed in claim 1 wherein said phase-shift in an isolated cell containing said first binary value has an absolute value of approximately 180° and said phase-shift in a non-isolated cell containing said first binary value has an absolute value of approximately 120°.

7. The method claimed in claim 1 wherein said phase-shift is not instantaneous and for each non-isolated cell containing said first binary value and that respectively precedes or follows an isolated cell containing said second binary value or a block of consecutive cells each containing said second binary value, said phase-shift corresponds mathematically and/or physically to a negative or positive frequency pulse, respectively.

8. The method claimed in claim 1 wherein said phase-shifts in successive isolated cells containing said first binary value alternately correspond mathematically to positive and negative frequency pulses of said carrier wave.

9. The method claimed in claim 1 wherein said phase-shifts are substantially at the center of said cells.

10. The method claimed in claim 1 wherein the ratio of said high mean optical power to said low mean optical power is at most equal to 20.

* * * * *

UNITED STATES PATENT AND TRADEMARK OFFICE
CERTIFICATE OF CORRECTION

PATENT NO. : 5,920,416
DATED : July 6, 1999
INVENTOR(S) : Jean-Luc Beylat, Jose Chesnoy, Paris FRANCE, Denis PENNINCKX It is certified that error appears in the above-identified patent and that said Letters Patent is hereby corrected as shown below:

On the Cover Sheet - Insert the Assignee:--Alcatel CIT
Paris, France--

Signed and Sealed this

Thirteenth Day of June, 2000

Attest:

Q. TODD DICKINSON

*Attesting Officer*  *Director of Patents and Trademarks*